US008422070B2

(12) United States Patent
Yamauchi

(10) Patent No.: US 8,422,070 B2
(45) Date of Patent: Apr. 16, 2013

(54) IMAGE PROCESSING APPARATUS, METHOD, AND COMPUTER READABLE STORAGE MEDIUM FOR TONER REDUCTION BASED ON IMAGE DATA TYPE AND AREA SIZE

(75) Inventor: Yasuki Yamauchi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1094 days.

(21) Appl. No.: 12/181,829

(22) Filed: Jul. 29, 2008

(65) Prior Publication Data

US 2009/0073462 A1 Mar. 19, 2009

(30) Foreign Application Priority Data

Sep. 14, 2007 (JP) ................................ 2007-239980

(51) Int. Cl.

| | |
|---|---|
| ***G06K 15/02*** | (2006.01) |
| ***G06K 15/00*** | (2006.01) |
| ***G03G 15/0831*** | (2006.01) |
| ***G03G 15/5033*** | (2006.01) |

(52) U.S. Cl.
USPC ................ 358/1.9; 358/1.14; 399/27; 399/49

(58) Field of Classification Search ........................ None
See application file for complete search history.

(56) References Cited

U.S. PATENT DOCUMENTS

| | | | | |
|---|---|---|---|---|
| 5,337,167 | A * | 8/1994 | Hiratsuka et al. ............. | 358/533 |
| 7,298,522 | B2 | 11/2007 | Sugimoto | |
| 2001/0021031 | A1 | 9/2001 | Hashimoto et al. | |
| 2004/0036897 | A1* | 2/2004 | Yamauchi ...................... | 358/1.9 |
| 2004/0223174 | A1* | 11/2004 | Mikami ......................... | 358/1.9 |
| 2005/0146755 | A1 | 7/2005 | Shimokawa et al. | |
| 2006/0217954 | A1* | 9/2006 | Koyama et al. ................... | 704/2 |
| 2007/0002348 | A1 | 1/2007 | Hagiwara | |
| 2007/0058188 | A1 | 3/2007 | Nakahara | |

FOREIGN PATENT DOCUMENTS

| | | |
|---|---|---|
| CN | 1932671 A | 3/2007 |
| JP | A-09-245150 | 9/1997 |
| JP | A-11-151833 | 6/1999 |
| JP | A-2000-132006 | 5/2000 |
| JP | A-2001-083845 | 3/2001 |
| JP | A-2001-232903 | 8/2001 |
| JP | A-2003-76097 | 3/2003 |
| JP | A-2004-101870 | 4/2004 |
| JP | A-2006-256299 | 9/2006 |
| JP | A-2007-174698 | 7/2007 |

OTHER PUBLICATIONS

English Language Version of Office Action issued in Japanese Patent Application No. 2007-239980, on Nov. 4, 2009.
Office Action issued in Chinese Patent Application No. 200810210805.3 dated Apr. 20, 2011 (with Translation).
Office Action issued in Japanese Patent Application No. 2007-239980, on Jun. 8, 2010.

* cited by examiner

*Primary Examiner* — Fan Zhang
(74) *Attorney, Agent, or Firm* — Oliff & Berridge, PLC

(57) ABSTRACT

The image processing apparatus is provided with: a reception unit that receives image information; an acquisition unit that acquires target information on a targeted level of an image forming material used at image formation based on the image information received by the reception unit; and a determination unit that determines a content of processing for reducing the image forming material for each portion of the image information received by the reception unit in accordance with the target information acquired by the acquisition unit.

7 Claims, 12 Drawing Sheets

IMAGE PROCESSING APPARATUS, METHOD, AND COMPUTER READABLE STORAGE MEDIUM FOR TONER REDUCTION BASED ON IMAGE DATA TYPE AND AREA SIZE

CROSS REFERENCE TO RELATED APPLICATIONS

This application is based on and claims priority under 35 USC §119 from Japanese Patent Application No. 2007-239980 filed Sep. 14, 2007.

BACKGROUND

1. Technical Field

The present invention relates to an image processing apparatus, an image processing method and a computer readable medium storing a program.

2. Related Art

Recently, in order to consider environment, reduce running cost and the like, image forming apparatuses such as a printer and the like that are each provided with a mode in which printing is executed by using an image forming material (toner, for example) smaller in quantity than usual (toner-saving mode, for example) have emerged.

Here, in one conventional art relating to, for example, reduction in a used amount of toner, a toner-saving method is switched according to an object in an image.

SUMMARY

According to an aspect of the invention, there is provided an image processing apparatus including: a reception unit that receives image information; an acquisition unit that acquires target information on a targeted level of an image forming material used at image formation based on the image information received by the reception unit; and a determination unit that determines a content of processing for reducing the image forming material for each portion of the image information received by the reception unit in accordance with the target information acquired by the acquisition unit.

BRIEF DESCRIPTION OF THE DRAWINGS

Exemplary embodiment(s) of the present invention will be described in detail based on the following figures, wherein.

DETAILED DESCRIPTION

Hereinafter, a detailed description will be given for exemplary embodiments for carrying out the present invention with reference to the attached drawings.

Figure 1:
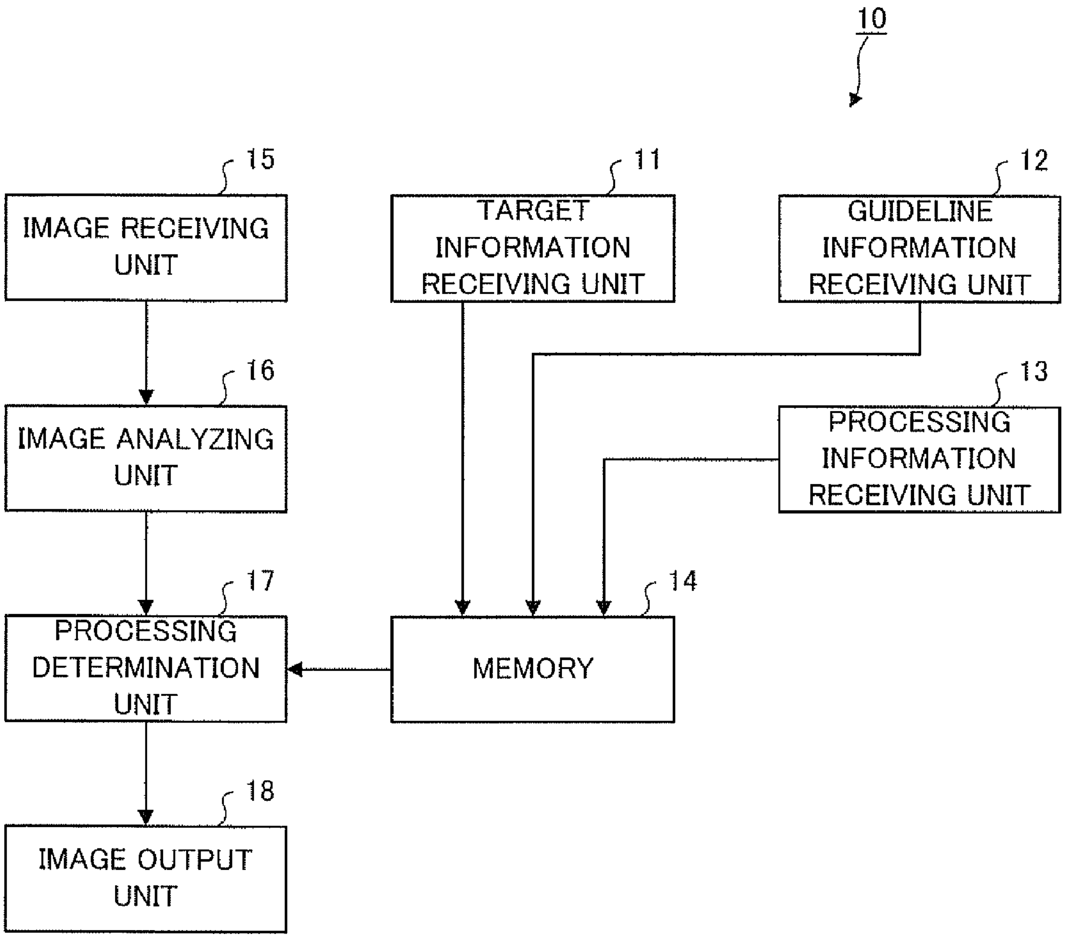
FIG. 1 is a block diagram illustrating a configuration example of the image processing apparatus according to the exemplary embodiment.

FIG. 1 is a block diagram illustrating a configuration example of the image processing apparatus 10 according to the exemplary embodiment.

The image processing apparatus 10 is installed inside the image forming apparatus such as a printer and a copy machine, for example. The image processing apparatus 10 performs a certain image processing for image data transmitted from a personal computer (PC) that is not shown in the figure, or image data read by the image reading apparatus that is not shown in the figure. The image data that have been given to the image processing are converted into color-material tone data of four colors that are C (cyan) M (magenta), Y (yellow) and K (black), and then the resultant data are outputted to the image forming units (not shown in the figure) inside the image forming apparatus. In the present exemplary embodiment, a description will be given while toner is exemplified as an image forming material.

As shown in the figure, the image processing apparatus 10 is provided with a target information receiving unit 11, a guideline information receiving unit 12, a processing information receiving unit 13, a memory 14, an image receiving unit 15, an image analyzing unit 16, a processing determination unit 17 and an image output unit 18.

The target information receiving unit 11 receives information (hereinafter referred to as "target information") relating to a targeted level of toner. Here, the target information may be designated as a toner reduction rate which is a proportion of a toner reduction amount to a usual toner use amount, for example In the present exemplary embodiment, the target information receiving unit 11 is provided as an example of an acquisition unit that acquires the target information.

The guideline information receiving unit 12 receives information to be a guideline when a toner is reduced (hereinafter referred to as "guideline information"). Here, the guideline information includes object types that are to be emphasized in the toner reduction processing and other information, for example. Other information in this case includes information in which the emphasized object type should be determined based on an area occupying in an image, and information in which the emphasized object type should be determined based on a position in an image. In addition, the guideline information may include information in which the guideline may be changed if there is more effective method. In the present exemplary embodiment, the guideline information receiving unit 12 is provided as an example of an acquisition unit that acquires guideline information.

The processing information receiving unit 13 receives information in which a type of toner reduction processing used for an image area of an object type is defined for each object type (hereinafter referred to as "processing information"). Here, since the object types include text (characters), graphics (figures), images (photos and pictures), and the types of the toner reduction processing include uniform processing, tone-emphasized processing, color-emphasized processing and the like, the processing information is information in which they are associated with each other. In the present exemplary embodiment, the processing information receiving unit 13 is provided as an example of an acquisition unit that acquires processing information.

The memory 14 stores the target information received by the target information receiving unit 11, the guideline information received by the guideline information receiving unit 12, and the processing information received by the processing information receiving unit 13.

The image receiving unit 15 receives image data that are to be printed from a PC, an image reading apparatus and the like, which are not shown in the figure. In the present exemplary embodiment, the image receiving unit 15 is provided as an example of a reception unit that receives image information.

The image analyzing unit 16 analyzes the image data received by the image receiving unit 15 so as to recognize objects included in the image data and divides the image data into objects.

The processing determination unit 17 refers to the target information, guideline information, processing information stored in the memory 14 for each object divided by the image analyzing unit 16 and determines contents of the toner reduction processing (a type, parameters and the like). In the present exemplary embodiment, the processing determination unit 17 is provided as an example of a determination unit that determines the contents of the processing to reduce the image forming material.

The image output unit 18 performs the determined toner reduction processing on the image data when the contents of the toner reduction processing that satisfies the toner targeted level indicated in the target information stored in the memory 14 is determined by the processing determination unit 17, and outputs the processed image data to an image forming part (not shown in the figure).

Here, a description will be given for a toner reduction processing used in the present exemplary embodiment and a function of the processing determination unit 17 for generating data (parameters) used in the toner reduction processing.

First, a uniform processing will be described.

Figure 2A:
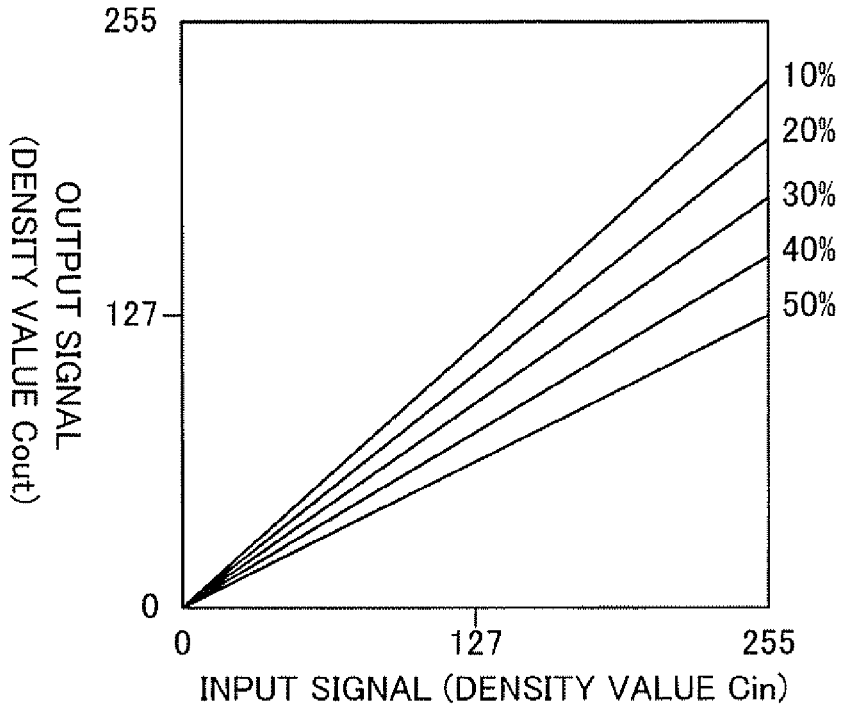
FIGS. 2A and 2B are diagrams for explaining parameter generation in the uniform processing.
Figure 2B:
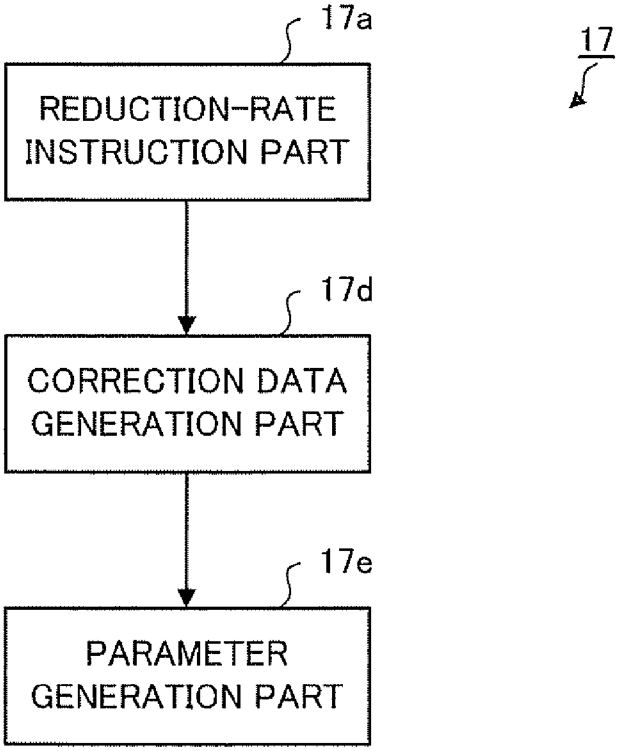

FIGS. 2A and 2B are diagrams for explaining parameter generation in the uniform processing.

FIG. 2A shows a relationship between a density value of an input signal and a density value of an output signal in the uniform processing. For example, in the case where the toner reduction rate is 10%, the density value of the output signal Cout is set to 90% of the density value of the input signal Cin. In the case where the toner reduction rate is 20%, the density value of the output signal Cout is set to 80% of the density value of the input signal Cin.

FIG. 2B is a block diagram illustrating a detail configuration example of the processing determination unit 17 relating to a parameter generation in the uniform processing. As shown in the figure, the processing determination unit 17 is provided with a reduction-rate instruction part 17*a* that instructs the toner reduction rate, a correction data generation part 17*d* that generates corrected data in accordance with the toner reduction rate, and a parameter generation part 17*e* that generates parameters on the basis of the correction data.

In the processing determination unit 17 having the above-described configuration, the reduction-rate instruction part 17*a* instructs the toner reduction rate when the uniform processing is executed. By this operation, the correction data generation part 17*d* specifies a straight line (refer to FIG. 2A) corresponding to the toner reduction rate. Then, the parameter generation part 17*e* acquires combinations of the density values of the input signal and the density values of the output signal, at points on the straight line at a given interval. These combinations are stored as, for example, a lookup table (LUT), and the conversion of the signal is carried out with reference to the LUT.

However, in the case where the uniform processing shown in FIGS. 2A and 2B is executed, an image density perceived by humans (perceived density) is not always changed in proportion to the toner reduction rate. For example, in the case of 10% reduction of the toner, the decreasing of the perceived density may change depending on the density.

This is because the output device has a specific tone characteristic that is not linear in general.

Figure 3:
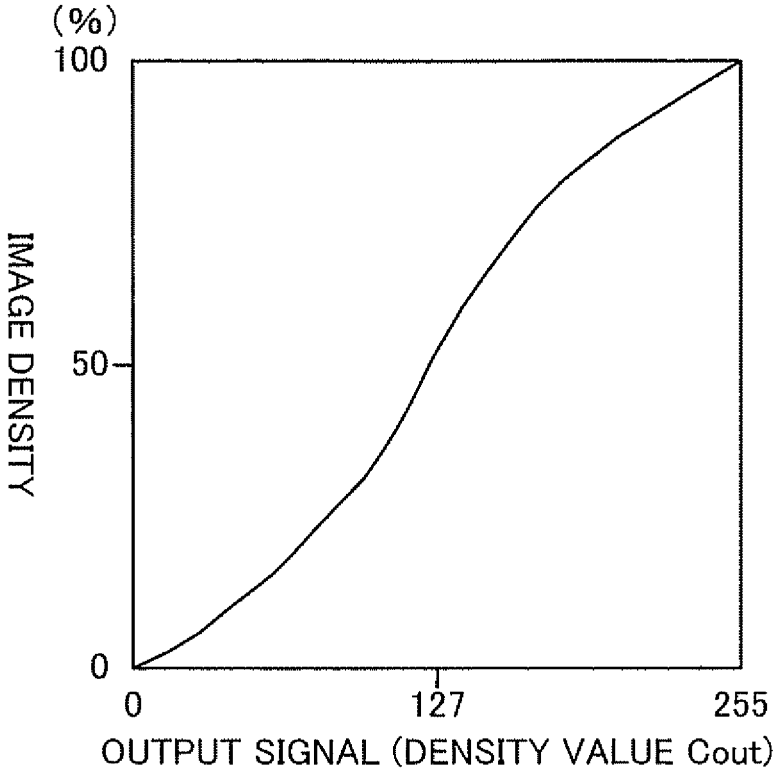
FIG. 3 shows an example of the tone characteristics.

FIG. 3 shows an example of the tone characteristics. Here, for example, an image density for output signals of 256 tones (the density values Cout=0 to 255) is expressed as a ratio thereof to the image density for Cout=255.

Consequently, in the present exemplary embodiment, a toner reduction processing in which the perceived density is lowered in proportion to the toner reduction amount is executed. This is the tone-emphasized processing.

Next, the tone-emphasized processing will be described.

Figure 4A:
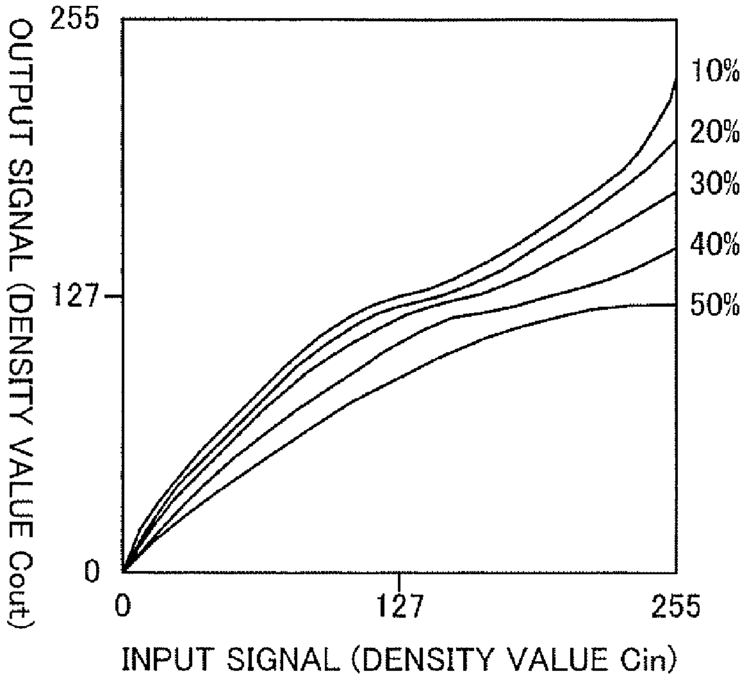
FIGS. 4A and 4B are diagrams for explaining parameter generation in the tone-emphasized processing.
Figure 4B:
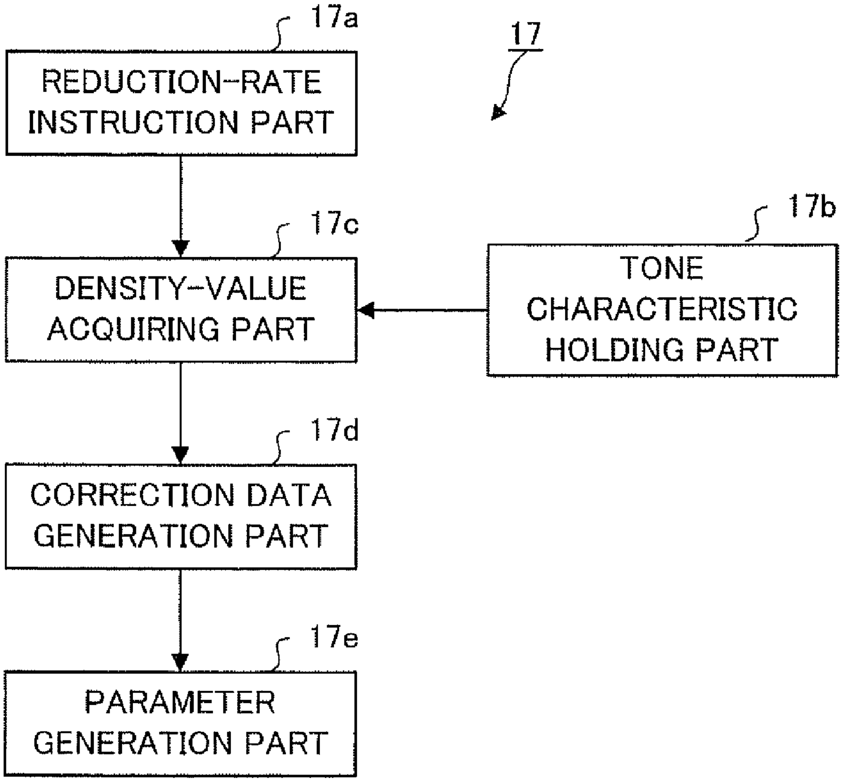

FIGS. 4A and 4B are diagrams for explaining parameter generation in the tone-emphasized processing.

FIG. 4A shows a relationship between a density value of an input signal and a density value of an output signal in the tone-emphasized processing. For example, in the case where the toner reduction rate is 10%, if it is assumed that a density value Cout of the output signal with respect to a density value Cin of the input signal is an output signal Cout in FIG. 3, the image density is to be 90%. Further, in the case where the toner reduction rate is 20%, if it is assumed that the density value Cout of the output signal with respect to the density value Cin of the input signal is the output signal Cout in FIG. 3, the image density is to be 80%.

FIG. 4B is a block diagram illustrating a detailed configuration example of the processing determination unit 17 relating to the parameter generation in the tone-emphasized processing. As shown in the figure, the processing determination unit 17 is provided with a reduction-rate instruction part 17*a* that instructs the toner reduction rate, a tone characteristic holding part 17*b* that holds information relating to the tone characteristics (refer to FIG. 3), and a density-value acquiring part 17*c* that acquires a density value of an output signal with respect to each density value of an input signal on the basis of the toner reduction rate and the tone characteristics. In addition, the processing determination unit 17 is provided with the correction data generation part 17*d* that generates corrected data from the acquired density value, and the parameter generation part 17*e* that generates parameters on the basis of the corrected data.

In the processing determination unit 17 having such a configuration, the reduction-rate instruction part 17*a* instructs the toner reduction rate when the tone-emphasized processing is executed. By this instruction, the density-value acquiring part 17*c* refers to the tone characteristics held by the tone characteristics holding part 17*b* (refer to FIG. 3) and acquires the density value of the output signal with respect to each density value of the input signal. For example, with respect to the density values of the input signal (0, 5, 10, 15, . . . 255), the density values of the output signal (Cout (0), Cout (5), Cout (10), Cout (15), . . . Cout (255)) are acquired. Here, if 10% is instructed as the toner reduction rate, Cout (0), Cout (5), Cout (10), Cout (15), . . . Cout (255) indicate the density values of the output signal with the image densities of 0, 4.5, 9, 13.5, . . . 229.5, respectively. By this operation, the correction data generation part 17*d* generates a characteristic curve corresponding to the instructed toner reduction rate (refer to FIG. 4A). Then, the parameter generation part 17*e* acquires combinations of the density values of the input signal and the density values of the output signal at points on the characteristic curve at a given interval. These combinations are held as, for example, LUT, and the conversion of the signal is carried out with reference to the LUT.

One reason that the perceptual density is not always changed in proportion to the toner reduction rate is that, in addition to the above reason, the human perceptual characteristics to the density are not linear. Thus, perceptual linearity may be experimentally acquired in advance and provided as a representative value so that similar conversion may be conducted using the value.

Further, a toner reduction processing other than the uniform processing and tone-emphasized processing includes a color-emphasized processing.

The color-emphasized processing reduces a toner amount while chroma is maintained as it is, for example. For example, a L*a*b* value that has chroma substantially equivalent to that of the L*a*b* value corresponding to C, M, Y and K on the input side and that the densities of corresponding C, M, Y and K on the output side are lowered is acquired. Then, the combinations of C, M, Y and K on the input side and C, M, Y and K on the output side are held as, for example, a LUT, and signal conversion may be made referring to the combinations.

Moreover, with regard to images (photos, for example) a processing that changes a dither pattern or a pattern of an error diffusion method may be conducted.

Next, a description will be given for operation of the image processing apparatus 10 in the present exemplary embodiment.

Figure 5:
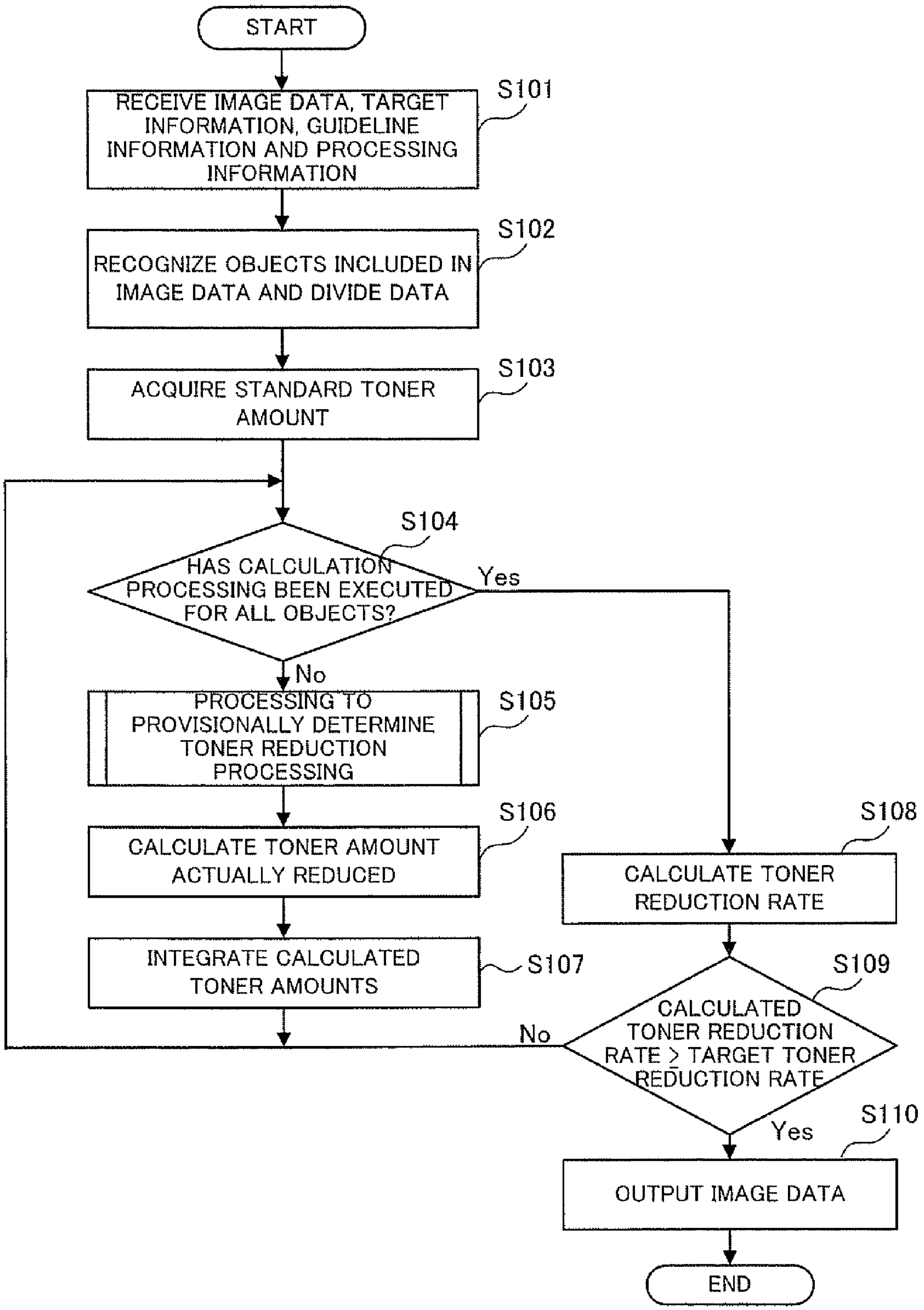
FIG. 5 is a flowchart illustrating an operation example of the image processing apparatus.

FIG. 5 is a flowchart illustrating an operation example of the image processing apparatus 10. Although the detailed description will be given later, prior to the operation, the target information (a toner reduction rate, for example), guideline information (saving guidelines, for example), processing information (correspondence between the object type and the type of toner reduction processing, for example) are to be designated by a user. Here, the saving guidelines include a guideline that emphasizes a specific object type (a specific-object emphasized guideline), a guideline that gives a priority to an object type determined based on an area occupied by an object in an image (an area-emphasized guideline), a guideline that gives a priority to an object type determined based on a position in an image (a position-emphasized guideline) and the like.

In the image processing apparatus 10, first, the image receiving unit 15 receives the image data, the target information receiving unit 11 receives the target information, the guideline information receiving unit 12 receives the guideline information, and the processing information receiving unit 13 receives the processing information (step 101). At this time, the target information, the guideline information, and the processing information are stored in the memory 14. Then, the image analyzing unit 16 analyzes the image data received by the image receiving unit 15, recognizes objects included in the image data, and divides the data (step 102). Here, the types of objects include, as mentioned above, text, graphics, images and the like.

Next, a toner amount usually consumed when the processing determination unit 17 executes image formation based on the image data acquired by the image receiving unit 15 is acquired as a standard toner amount (step 103). Then, for all the object types, the types of the toner reduction processing and parameters are determined.

Specifically, first, it is determined whether or not a calculation processing of the toner reduction amount has been executed for all the objects (step 104).

Here, if the processing has not been executed for all the objects, a processing to provisionally determine the toner reduction processing for the object type is executed on the basis of the target information, the guideline information and the processing information stored in the memory 14 (step 105). The detail of the determining processing will be described later. Thereafter, the processing determination unit 17 calculates a toner amount actually reduced when the toner reduction processing provisionally determined at step 105 is used (step 106). Then, the calculated toner amounts are integrated to the reduced toner amount indicating a toner amount reduced as the image data as a whole (step 107), and the process returns to step 104.

In this way, the processing determination unit 17 executes the determination of the toner reduction processing and the integration of the reduced toner amount by the toner reduction processing for all the objects. Specifically, the processing at steps 105 to 107 is executed till it is determined that the processing has been conducted for all the objects at step 104, and, when it is determined that the processing has been conducted for all the objects, the reduced toner amount is divided by the standard toner amount so as to calculate the toner reduction rate (step 108). Then, it is determined whether or not the calculated toner reduction rate is not less than the target toner reduction rate stored in the memory 14 (step 109). As a result, if the calculated toner reduction rate is less than the target toner reduction rate, the processing at steps 104 to 108 is repeated. On the other hand, if the calculated rate exceeds the target toner reduction rate, the image output unit 18 performs the toner reduction processing determined at that time on the image data, and output the image data to the image forming part (step 110).

Here, a detailed description will be given for the determining processing of the toner reduction processing at step 105. As mentioned above, one of information used in the determining processing is the information on the saving guideline designated by the user. As mentioned in the above, the saving guideline includes the specific-object emphasized guideline, the area-emphasized guideline, the position-emphasized guideline and the like. Here, a case where the first two saving guidelines are designated will be described.

First, a description will be given for the determining processing of the toner reduction processing when the specific-object emphasized guideline is designated. It should be noted that the specific-object emphasized guideline is a saving guideline in which, by emphasizing a specific object type, an influence by the toner reduction processing on the object type is restricted as much as possible.

Figure 6:
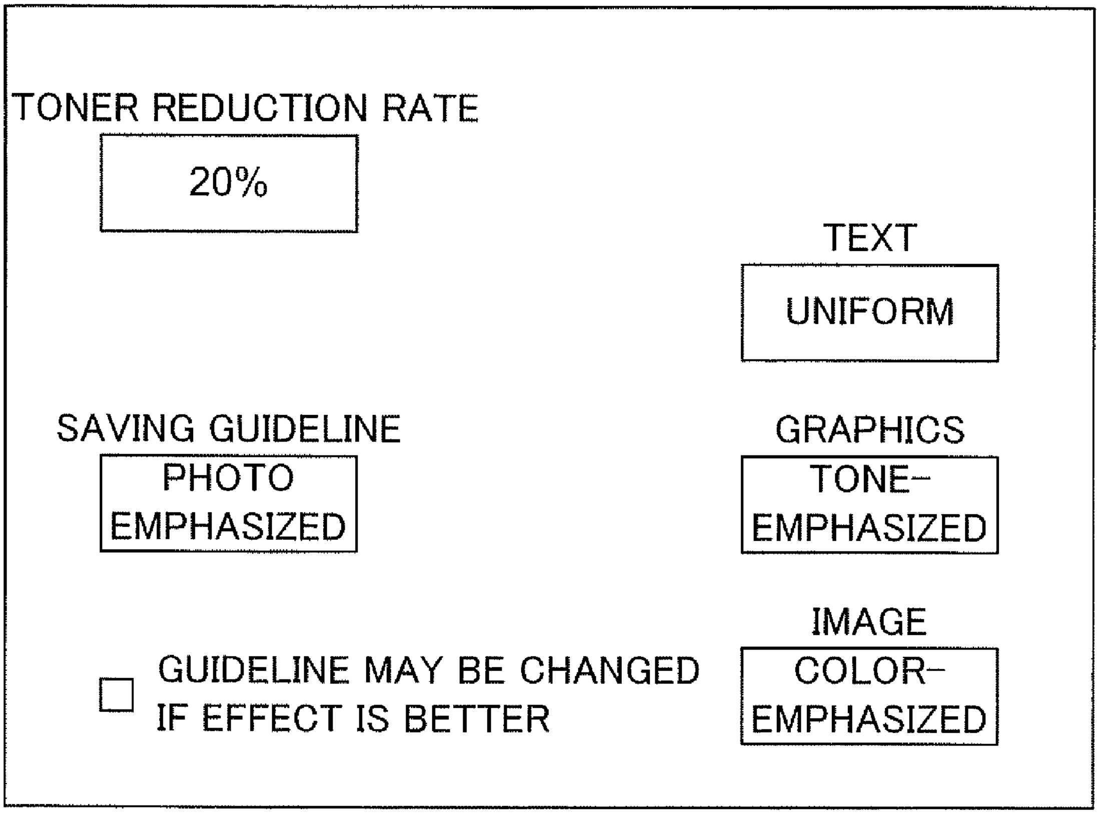
FIG. 6 shows an example of designation on a user interface in a case where the specific-object emphasized guideline is designated.

FIG. 6 shows an example of designation on a user interface in this case. The user interface may be displayed by a printer driver on a PC side if the toner reduction processing is executed by a printer. If the toner reduction processing is executed by a copying machine, the specification may be displayed on a display panel on the copying machine side.

In this example of the designation, the toner reduction rate of "20%" is designated as the target information. Further, with regard to the processing information, a uniform processing for text, a tone-emphasized processing for graphics, and a color-emphasized processing for images are designated. Moreover, in this case, a specific object type to be emphasized is designated as the saving guideline, and it is designated as "photo emphasized" in the figure. Specifically this is the guideline in which images are emphasized among text, graphics and images.

Figure 7:
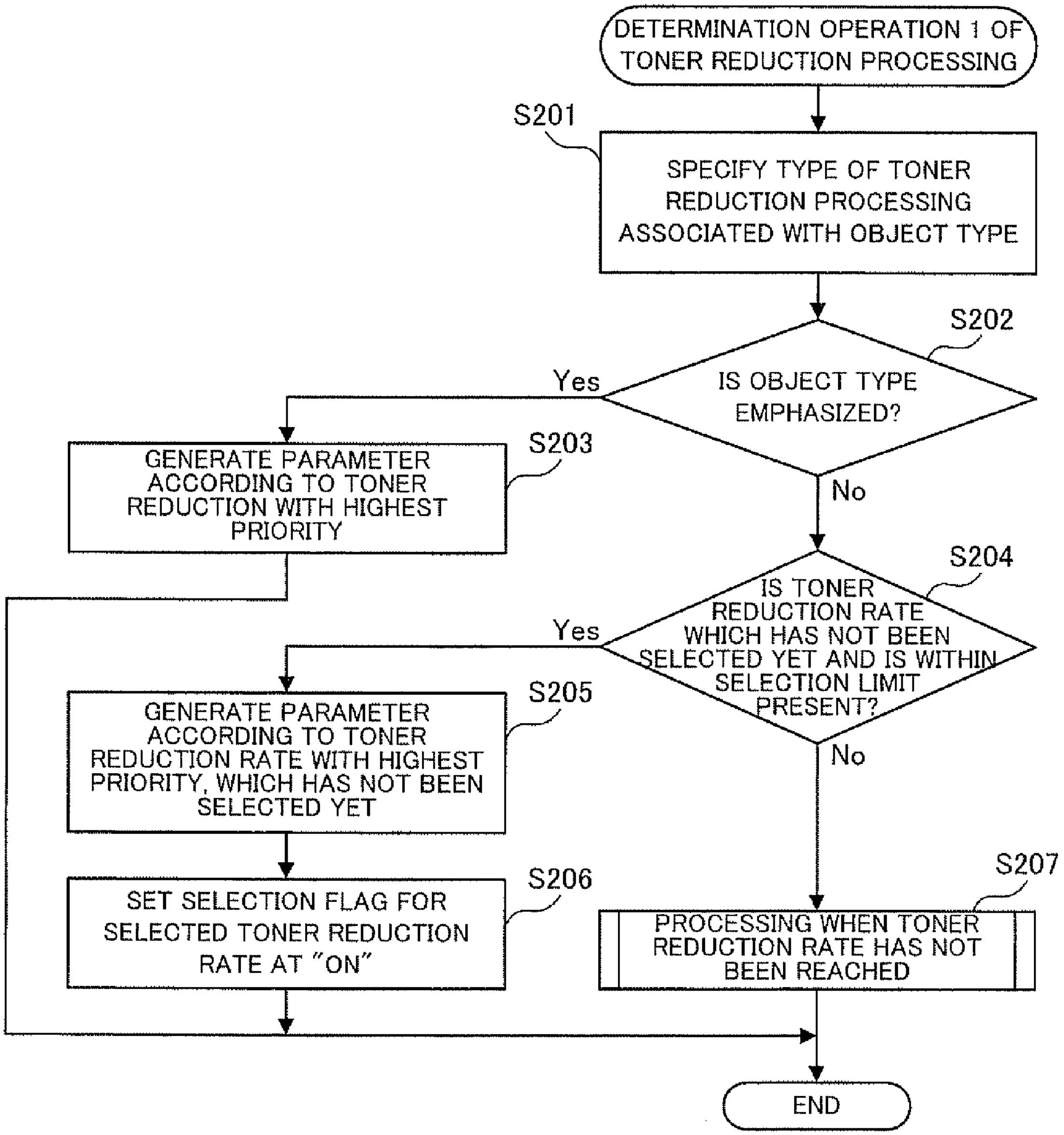
FIG. 7 is a flowchart illustrating a determination operation example of the toner reduction processing by the processing determination unit in a case where the specific-object emphasized guideline is designated.

FIG. 7 is a flowchart illustrating a determination operation example of the toner reduction processing (determination operation 1 of the toner reduction processing) by the processing determination unit 17 in this case. This flowchart shows an operation relating to the object type focused at step 105 in FIG. 5.

First, the processing determination unit 17 refers to the processing information stored in the memory 14, and specifies a type of the toner reduction processing associated with the focused object type (step 201). For example, if the focused object type is "graphics," the tone-emphasized processing is specified as the toner reduction processing.

Then, it is determined whether the focused object type is designated as an object type to be emphasized or not by referring to the guideline information stored in the memory 14 (step 202).

Here, if the object type is designated as the object type to be emphasized, the toner reduction rate with the highest priority is selected among the toner reduction rates set in advance for the toner reduction processing specified at step 201, and a parameter according to the selected toner reduction rate is generated (step 203). For example, if the toner reduction rates for the tone-emphasized processing are set at "10%," "20%," . . . in the order from the highest priority, the reduction-rate instruction part 17*a* instructs "10%" as the toner reduction rate. Then, the density-value acquiring part 17*c*, the correction data generation part 17*d* and the parameter generation part 17*e* generate the parameter on the basis of the characteristic curve corresponding to "10%."

On the other hand, if the object type is not designated as the object type to be emphasized, it is determined whether or not a toner reduction rate which has not been selected yet and is within a selection limit is present among the toner reduction rates set in advance for the toner reduction processing specified at step 201 (step 204). In this case, the determination that the rate has not been selected yet may be made on a condition that a selected flag set for each toner reduction rate is not "ON" yet. The selection limit is information indicating a limit of level up to which the toner reduction rate is selectable. The selection limit is set, because, even if the toner reduction rates are from 10 to 90% theoretically, deterioration in an image becomes too noticeable in the case of excessively reducing the toner.

If a toner reduction rate which has not been selected yet and is within a selection limit is present, the rate with the highest priority is selected among them, and a parameter according to the selected toner reduction rate is generated (step 205). For example, if the toner reduction rates for the tone-emphasized processing are set at "10%," "20%," . . . in the order from the highest priority, and the selection flag of "10%" is set at "ON", the reduction-rate instruction part 17*a* instructs "20%" as the toner reduction rate. Then, the density-value acquiring part 17*c*, the correction data generation part 17*d* and the parameter generation part 17*e* generate parameters based on the characteristic curve corresponding to "20%."

After that, the processing determination unit 17 sets the selection flag for the selected toner reduction rate at "ON." (step 206).

On the other hand, if a toner reduction rate which has not been selected yet and is within a selection limit is not present, a processing when the toner reduction rate has not been reached, which will be described later, is executed (step 207).

Next, a description will be given for the determining processing of the toner reduction processing when the area-emphasized guideline is designated. It should be noted that, since it is considered that the object type occupying the larger area in an image has the better effect on the toner reduction processing, the area-emphasized guideline is a guideline in which the object type occupying an area larger than a certain level is set to a target of toner reduction with priority, for example.

Figure 8:
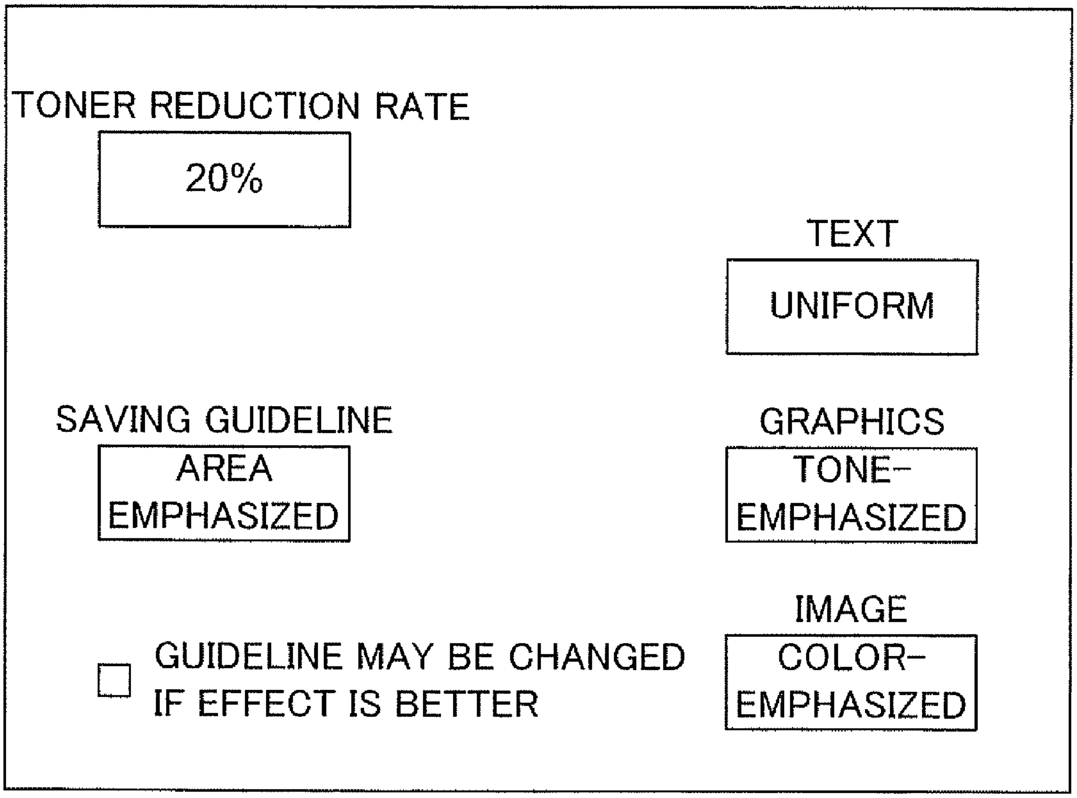
FIG. 8 shows an example of designation on a user interface in a case where the area-emphasized guideline is designated.

FIG. 8 shows an example of designation on a user interface in this case. The user interface may be displayed by a printer driver on a PC side if the toner reduction processing is executed by a printer. If the toner reduction processing is executed by a copying machine, the specification may be displayed on a display panel on the copying machine side.

In this example of the designation, the toner reduction rate of "20%" is designated as the target information. Further, with regard to the processing information, the uniform processing for text, the tone-emphasized processing for graphics, and the color-emphasized processing for images are designated. Moreover, in this case, a saving guideline is designated as "an area emphasized."

Figure 9:
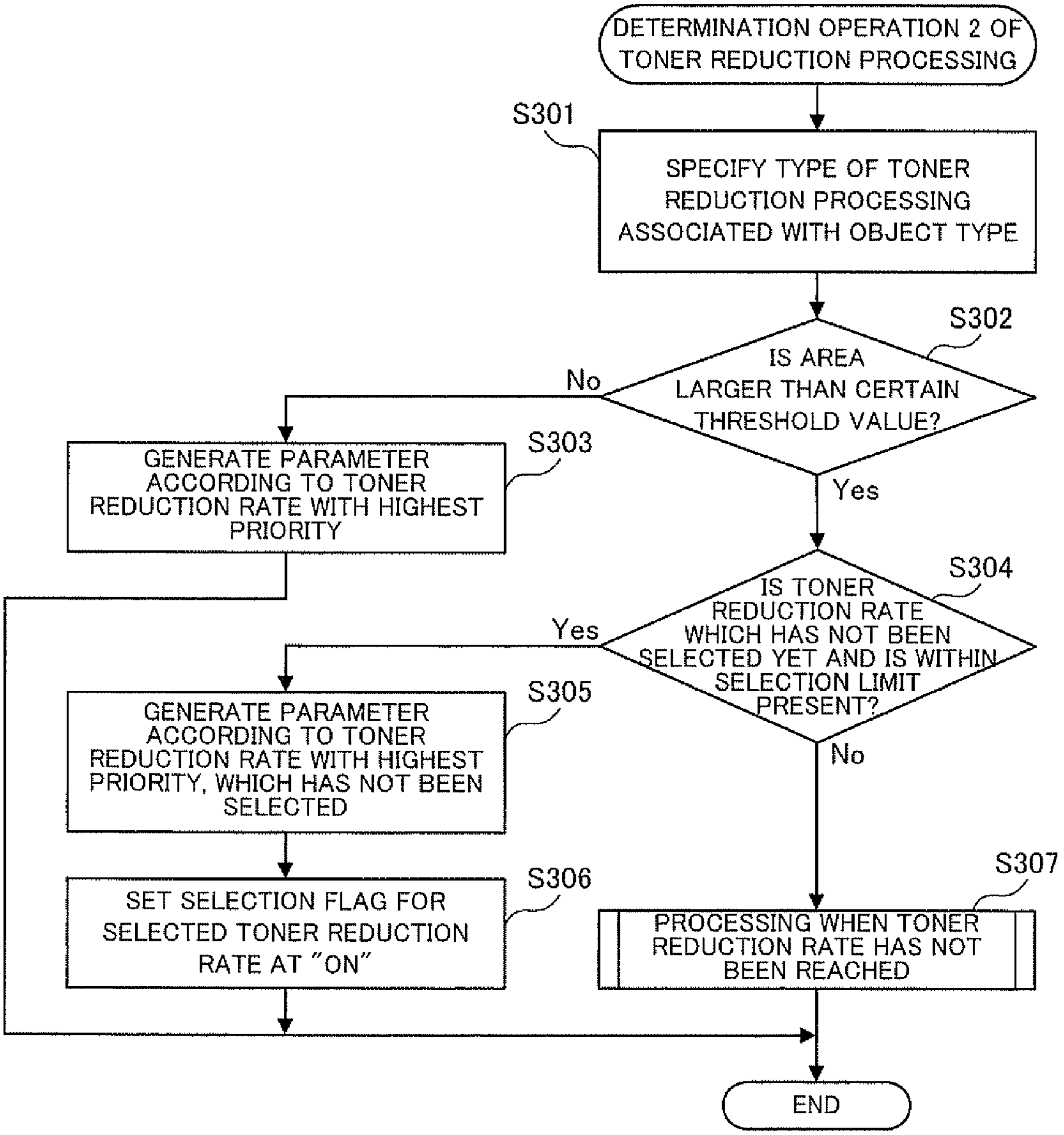
FIG. 9 is a flowchart illustrating an example of a determination operation of the toner reduction processing by the processing determination unit in a case where the area-emphasized guideline is designated.

FIG. 9 is a flowchart illustrating an example of a determination operation of the toner reduction processing (a determination operation 2 of the toner reduction processing) by the processing determination unit 17 in this case. This flowchart shows an operation relating to the object type focused at step 105 in FIG. 5.

First, the processing determination unit 17 refers to the processing information stored in the memory 14, and specifies a type of the toner reduction processing associated with the focused object type (step 301). For example, if the focused object type is "graphics," the tone-emphasized processing is specified as the toner reduction processing.

Then, it is determined whether an area occupied by the focused object type is larger than a certain threshold value or not by referring to the guideline information stored in the memory 14 (step 302).

Here, if the area is not larger than the certain threshold value, the toner reduction rate with the highest priority is selected among the toner reduction rates set in advance for the toner reduction processing specified at step 301, and a parameter according to the selected toner reduction rate is generated (step 303). For example, if the toner reduction rates for the tone-emphasized processing are set at "10%," "20%," . . . in the order from the highest priority, the reduction-rate instruction part 17*a* instructs "10%" as the toner reduction rate. Then, the density-value acquiring part 17*c*, the correction data generation part 17*d* and the parameter generation part 17*e* generate the parameter on the basis of the characteristic curve corresponding to "10%."

On the other hand, if the area is larger than the certain threshold value, it is determined whether or not a toner reduction rate which has not been selected yet and is within a selection limit is present among the toner reduction rates set in advance for the toner reduction processing specified at step 301 (step 304). In this case, the determination that the rate has not been selected yet may be made on a condition that a selected flag set for each toner reduction rate is not "ON" yet. The selection limit is information indicating a limit of level up to which the toner reduction rate is selectable. The selection limit is set, because, even if the toner reduction rates are from 10 to 90% theoretically, deterioration in an image becomes too noticeable in the case of excessively reducing the toner.

If a toner reduction rate which has not been selected yet and is within a selection limit is present, the rate with the highest priority is selected among them, and a parameter according to the selected toner reduction rate is generated (step 305). For example, if the toner reduction rates for the tone-emphasized processing are set at "10%," "20%," . . . in the order from the highest priority, and the selection flag of "10%" is set at "ON", the reduction-rate instruction part 17*a* instructs "20%" as the toner reduction rate. Then, the density-value acquiring part 17*c*, the correction data generation part 17*d* and the parameter generation part 17*e* generate parameters on the basis of the characteristic curve corresponding to "20%."

After that, the processing determination unit 17 sets the selection flag for the selected toner reduction rate at "ON." (step 306).

On the other hand, if a toner reduction rate which has not been selected yet and is within a selection limit is not present, a processing when the toner reduction rate has not been reached, which will be described later, is executed (step 307).

Then, a description will be given for the processing when the toner reduction rate has not been reached at step 207 or 307.

Figure 10:
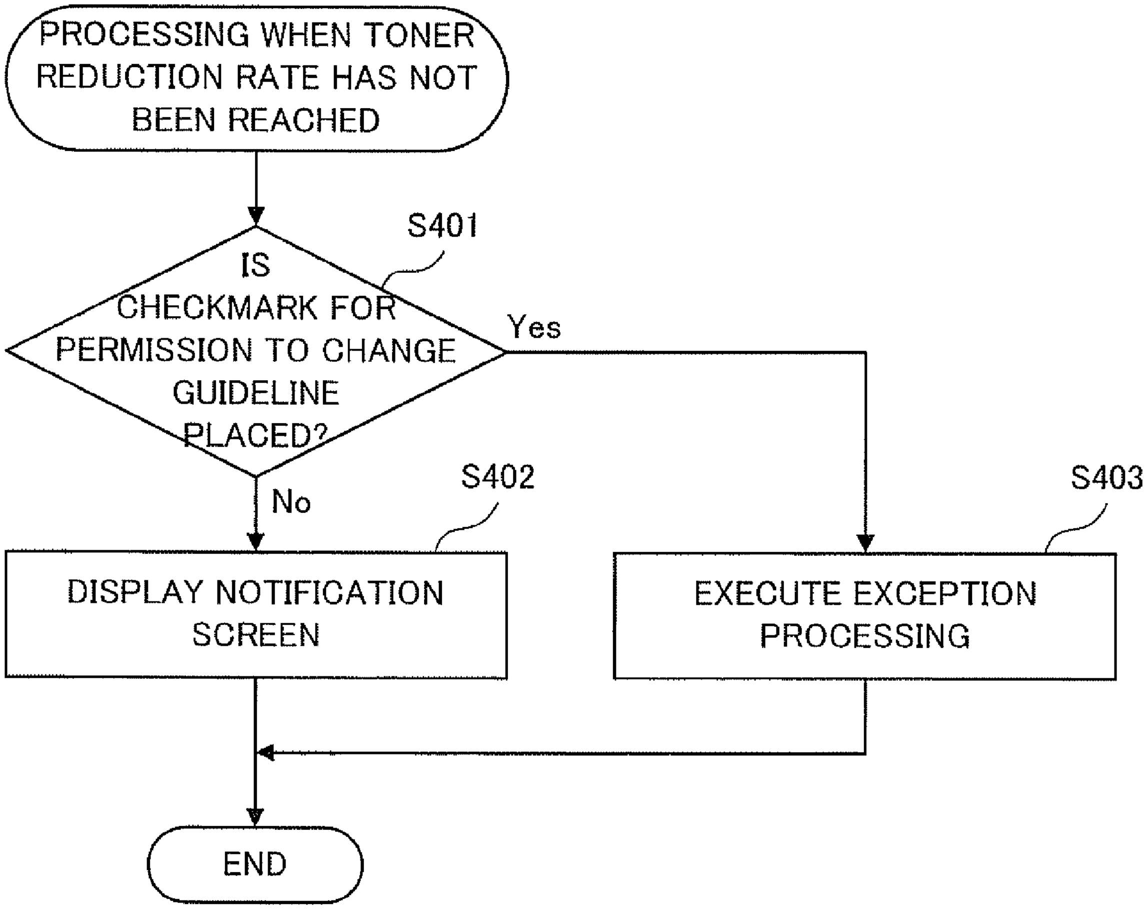
FIG. 10 is a flowchart illustrating an operation example of the processing when the toner reduction rate has not been attained.

FIG. 10 is a flowchart illustrating an operation example of the processing when the toner reduction rate has not been attained.

First, the processing determination unit 17 determines whether a checkmark for "Guideline may be changed if effect is better" (checkmark for permission to change the guideline) is placed or not in the user interface in FIG. 6 or FIG. 8 (step 401).

Here, if such a check is not made, a notification screen telling that deterioration of the image will be noticeable with the designated toner reduction rate is displayed for the user (step 402).

On the other hand, if such a check is made, an exception processing determined in advance and having an effect on the toner reduction is executed (step 403). The exception processing may include UCR (Under Color Removal) in which the toners of C, M, Y are replaced by the K toner, and the like.

A description will be given for a notification screen that is displayed in step 402.

Figure 11:
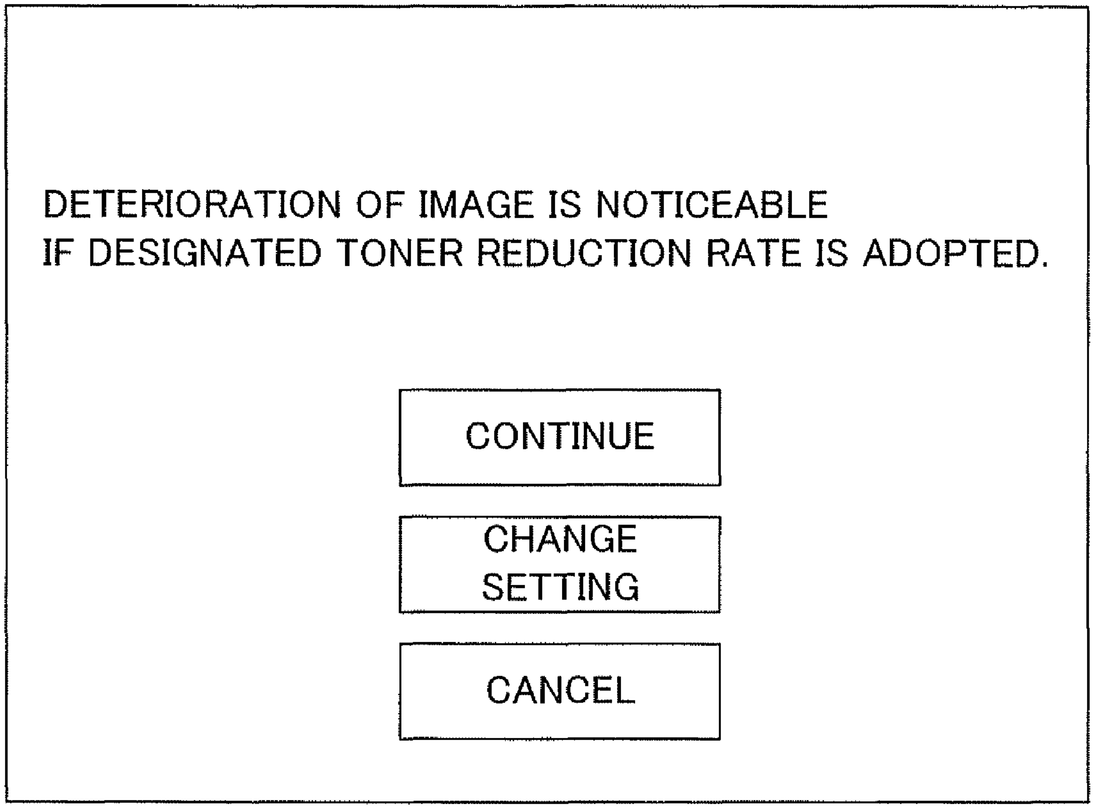
FIG. 11 shows an example of the notification screen.

FIG. 11 shows an example of the notification screen.

On the notification screen, "continue," "change setting," and "cancel" are displayed as choices, in addition to a message that deterioration of an image is noticeable if the designated toner reduction rate is adopted.

For example, if a user chooses "continue," the toner reduction processing is continued while the current setting is maintained. More specifically, although, on the above operation, a certain limitation is set for the toner reduction rate that is specified when the content of the toner-reduction processing is determined in order to avoid generation of the excessively deteriorated image, the toner reduction processing is continued without any consideration of the limitation if "continue" is chosen here.

If a user chooses "change setting," the toner reduction rate, the save guidance, the correspondence between the object type and the type of the toner reduction processing are changed. Then the toner reduction processing is continued.

If a user chooses "cancel," the toner reduction processing is terminated at this time, and an image is outputted without any toner reduction processing, for example.

In the above-mentioned exemplary embodiment, the toner reduction processing is determined for each object type, but it is not necessarily limited to such a configuration. Specifically, a portion of an image which is a target for determining the toner reduction processing may be set regardless of the object type, or the toner reduction processing may be determined separately for image portions of the same object type.

Alternatively, a guideline other than those exemplified in the above may be employed as the saving guideline. For example, a guideline in which the toner saving is realized so that an impression of an original image remains may be accepted.

The image processing apparatus 10 according to the present exemplary embodiment may be realized by a general-purpose computer. A description will be given for a hardware configuration when the image processing apparatus 10 is to be realized by a computer 90.

Figure 12:
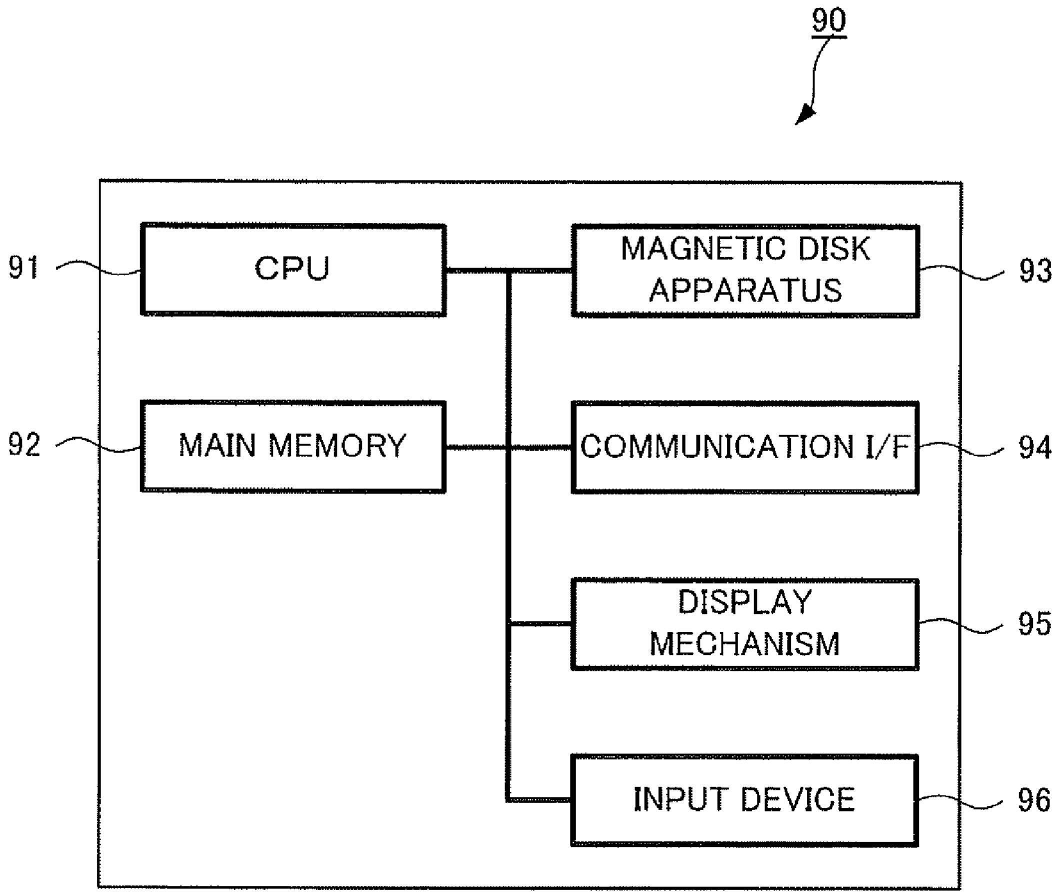
FIG. 12 is a diagram illustrating a hardware configuration of the computer.

FIG. 12 is a diagram illustrating a hardware configuration of the computer 90.

As shown in the figure, the computer 90 is provided with a CPU (Central Processing Unit) 91 as an computing unit, and a main memory 92 and a magnetic disk apparatus (HDD: Hard Disk Drive) 93 that are a memory. Here, the CPU 91 executes OS (Operating System) and various kinds of software such as application and the like, and realizes various functions described above. The main memory 92 is a memory area that stores various kinds of software, data used for executing the software and the like. The magnetic disk apparatus 93 is a memory area that stores input data to various kinds of software, output data from various kinds of software and the like.

Further, the computer 90 is provided with a communication I/F 94 that performs communication with an exterior, a display mechanism 95 including a video memory, a display and the like, and an input device 96 such as a keyboard, a mouse or the like.

The program that realizes the present exemplary embodiment may be provided not only by a communication device but also by being stored in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:

a reception unit that receives image information;

an acquisition unit that acquires target information on a targeted level of an image forming material used at image formation based on the image information received by the reception unit and processing information for determining any one of uniform reduction processing for reducing a predetermined proportion of the image forming material uniformly and tone-emphasized reduction processing for reducing the image forming material by an amount determined by tone characteristics of an output device so that an image density is reduced by a predetermined proportion for each portion of the image information; and a determination unit that determines a content of processing for reducing the image forming material by determining the predetermined proportion used in the processing that is determined for the portion of the image information among the uniform reduction processing and the tone-emphasized reduction processing determined by the processing information acquired by the acquisition unit, wherein the determination unit performs reduction amount calculation processing for calculating a reduction amount of the image forming material in a case where the determined content of the processing is executed, if the reduction amount does not satisfy the target information, the determination unit changes the content of the processing for reducing the image forming material by changing the predetermined proportion and performs the reduction amount calculation processing, and if the reduction amount satisfies the target information, then determination unit finally determines the changed content of the processing as the content of the processing for reducing the image forming material, the portion of the image information is an object constituting the image information, the determination unit determines a specific object on the basis of a characteristic of the specific object, and determines a content of the processing for reducing the image forming material so that a better reduction effect of the image forming material is obtained for the specific object than for an object other than the specific object, the acquisition unit further acquires guideline information to be a guideline for reducing the image forming material, the determination unit determines the specific object on the basis of the guideline information acquired by the acquisition unit, the reduction amount calculation process applies a minimum reduction rate for reducing the image forming material in the case that the area of the object is smaller than a threshold size, and the reduction amount calculation process (1) applies the next unselected minimum reduction rate for reducing the image forming material that is within a predetermined selection limit or (2) executes exception processing for changing the guideline for reducing the image forming material that is not within the predetermined selection limit in the case that the area of the object is larger than the threshold size.

2. The image processing apparatus according to claim 1, wherein the determination unit determines the specific object on the basis of designation of a type of the specific object.

3. The image processing apparatus according to claim 1, wherein the determination unit determines the specific object on the basis of an area occupied by the specific object in the image information.

4. The image processing apparatus according to claim 1, wherein the determination unit determines the specific object on the basis of a position of the specific object in the image information.

5. The image processing apparatus according to claim 1, wherein the determination unit determines execution of an exception processing which is set in advance as a processing that has a better reduction effect of the image forming material, if the determination unit is unable to determine a content of processing satisfying a given standard.

6. An image processing method comprising:

receiving image information;

acquiring target information on a targeted level of an image forming material used at image formation based on the received image information and processing information for determining any one of uniform reduction processing for reducing a predetermined proportion of the image forming material uniformly and tone-emphasized reduction processing for reducing the image forming material by an amount determined by tone characteristics of an output device so that an image density is reduced by a predetermined proportion for each portion of the image information, wherein the portion of the image information is an object constituting the image information;

determining a content of processing for reducing the image forming material by determining the predetermined proportion used in the processing that is determined for the portion of the image information among the uniform reduction processing and the tone-emphasized reduction processing determined by the processing information acquired by the acquisition unit;

performing reduction amount calculation processing for calculating a reduction amount of the image forming material in a case where the determined content of the processing is executed, wherein if the reduction amount does not satisfy the target information, the content of the processing for reducing the image forming material is changed by changing the predetermined proportion and the reduction amount calculation processing is performed, and wherein if the reduction amount satisfies the target information, then the changed content of the processing as the content of the processing for reducing the image forming material is finally determined;

determining a specific object on the basis of a characteristic of the specific object;

determining a content of the processing for reducing the image forming material so that a better reduction effect of the image forming material is obtained for the specific object than for an object other than the specific object; and acquiring guideline information to be a guideline for reducing the image forming material, wherein determining the specific object includes determining the specific object on the basis of the guideline information acquired by the acquisition unit, the reduction amount calculation processing includes applying a minimum reduction rate for reducing the image forming material in the case that the area of the object is smaller than a threshold size, and the reduction amount calculation processing includes (1) applying the next unselected minimum reduction rate for reducing the image forming material that is within a predetermined selection limit or (2) executing exception processing for changing the guideline for reducing the image forming material that is not within the predetermined selection limit in the case that the area of the object is larger than the threshold size.

7. A non-transitory computer readable medium storing a program causing a computer to execute a process for toner reduction, the process comprising:

receiving image information;

acquiring target information on a targeted level of an image forming material used at image formation based on the received image information and processing information for determining any one of uniform reduction processing for reducing a predetermined proportion of the image forming material uniformly and tone-emphasized reduction processing for reducing the image forming material by an amount determined by tone characteristics of an output device so that an image density is reduced by a predetermined proportion for each portion of the image information, wherein the portion of the image information is an object constituting the image information;

determining a content of processing for reducing the image forming material by determining the predetermined proportion used in the processing that is determined for the portion of the image information among the uniform reduction processing and the tone-emphasized reduction processing determined by the processing information acquired by the acquisition unit;

performing reduction amount calculation processing for calculating a reduction amount of the image forming material in a case where the determined content of the processing is executed, wherein if the reduction amount does not satisfy the target information, the content of the processing for reducing the image forming material is changed by changing the predetermined proportion and the reduction amount calculation processing is performed, and wherein if the reduction amount satisfies the target information, then the changed content of the processing as the content of the processing for reducing the image forming material is finally determined;

determining a specific object on the basis of a characteristic of the specific object;

determining a content of the processing for reducing the image forming material so that a better reduction effect of the image forming material is obtained for the specific object than for an object other than the specific object; and acquiring guideline information to be a guideline for reducing the image forming material, wherein determining the specific object includes determining the specific object on the basis of the guideline information acquired by the acquisition unit, the reduction amount calculation processing includes applying a minimum reduction rate for reducing the image forming material in the case that the area of the object is smaller than a threshold size, and the reduction amount calculation processing includes (1) applying the next unselected minimum reduction rate for reducing the image forming material that is within a predetermined selection limit or (2) executing exception processing for changing the guideline for reducing the image forming material that is not within the predetermined selection limit in the case that the area of the object is larger than the threshold size.

* * * * *